US012515653B2

(12) United States Patent
Chehade et al.

(10) Patent No.: US 12,515,653 B2
(45) Date of Patent: Jan. 6, 2026

(54) SIMULATING TRAFFIC SCENARIOS

(71) Applicant: Ford Global Technologies, LLC, Dearborn, MI (US)

(72) Inventors: Abdallah Chehade, Canton, MI (US); Sari Kassar, Plymouth, MI (US); Mayuresh Vijay Savargaonkar, Idaho Falls, ID (US); Vijit Dubey, Windsor (CA); Mark Douglas Malone, Canton, MI (US); Abhay Bhivare, Novi, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 156 days.

(21) Appl. No.: 18/492,810

(22) Filed: Oct. 24, 2023

(65) Prior Publication Data

US 2025/0128704 A1    Apr. 24, 2025

(51) Int. Cl.
*B60W 30/095*    (2012.01)
*B60W 30/085*    (2012.01)

(52) U.S. Cl.
CPC ...... *B60W 30/0956* (2013.01); *B60W 30/085* (2013.01); *B60W 2554/4049* (2020.02)

(58) Field of Classification Search
CPC ........... B60W 30/0956; B60W 30/085; B60W 2554/4049
See application file for complete search history.

(56) References Cited

U.S. PATENT DOCUMENTS

2020/0089247 A1    3/2020 Shkurti et al.
2021/0294944 A1*   9/2021 Nassar ................. G05D 1/0088
2021/0387643 A1*  12/2021 Hari .................... B60W 30/095
2022/0261519 A1    8/2022 Muehlenstaedt et al.
2023/0222267 A1*   7/2023 Muehlenstaedt ..... G06F 18/217
                                                              703/8

FOREIGN PATENT DOCUMENTS

WO    2022133090 A1    6/2022

OTHER PUBLICATIONS

Stahl et al., "Autonomous Driving Software Engineering—Lecture 09: Safety Assessment", https://www.researchgate.net/publication/352322387, Presentation • Jun. 2021.

* cited by examiner

*Primary Examiner* — Dylan M Katz
(74) *Attorney, Agent, or Firm* — Frank A. MacKenzie; Brooks Kushman P.C.

(57) ABSTRACT

A computer that includes a processor and a memory, the memory including instructions executable by the processor to generate first traffic scenarios including one or more objects based on initial object locations and initial object trajectories of the one or more objects, wherein the first traffic scenarios are generated with a three-dimensional simulation engine. Probabilities of impact can be determined between the one or more objects included in the first traffic scenarios; selecting a subset of the first traffic scenarios that include the probabilities of impact greater than a user-selected threshold. Second traffic scenarios can be generated based on perturbing the selected subset of the first traffic scenarios wherein the second traffic scenarios are generated with the three-dimensional simulation engine. A machine learning system can be trained based on the first and the second traffic scenarios.

20 Claims, 8 Drawing Sheets

SIMULATING TRAFFIC SCENARIOS

BACKGROUND

Computers can operate systems and/or devices including vehicles, robots, drones, and/or object tracking systems. Data including images can be acquired by sensors and processed by a computer to determine a location of a system with respect to an environment and with respect to objects in the environment. A computer may use the location data to determine one or more trajectories for operating the system or components thereof in the environment.

DETAILED DESCRIPTION

Figure 1:
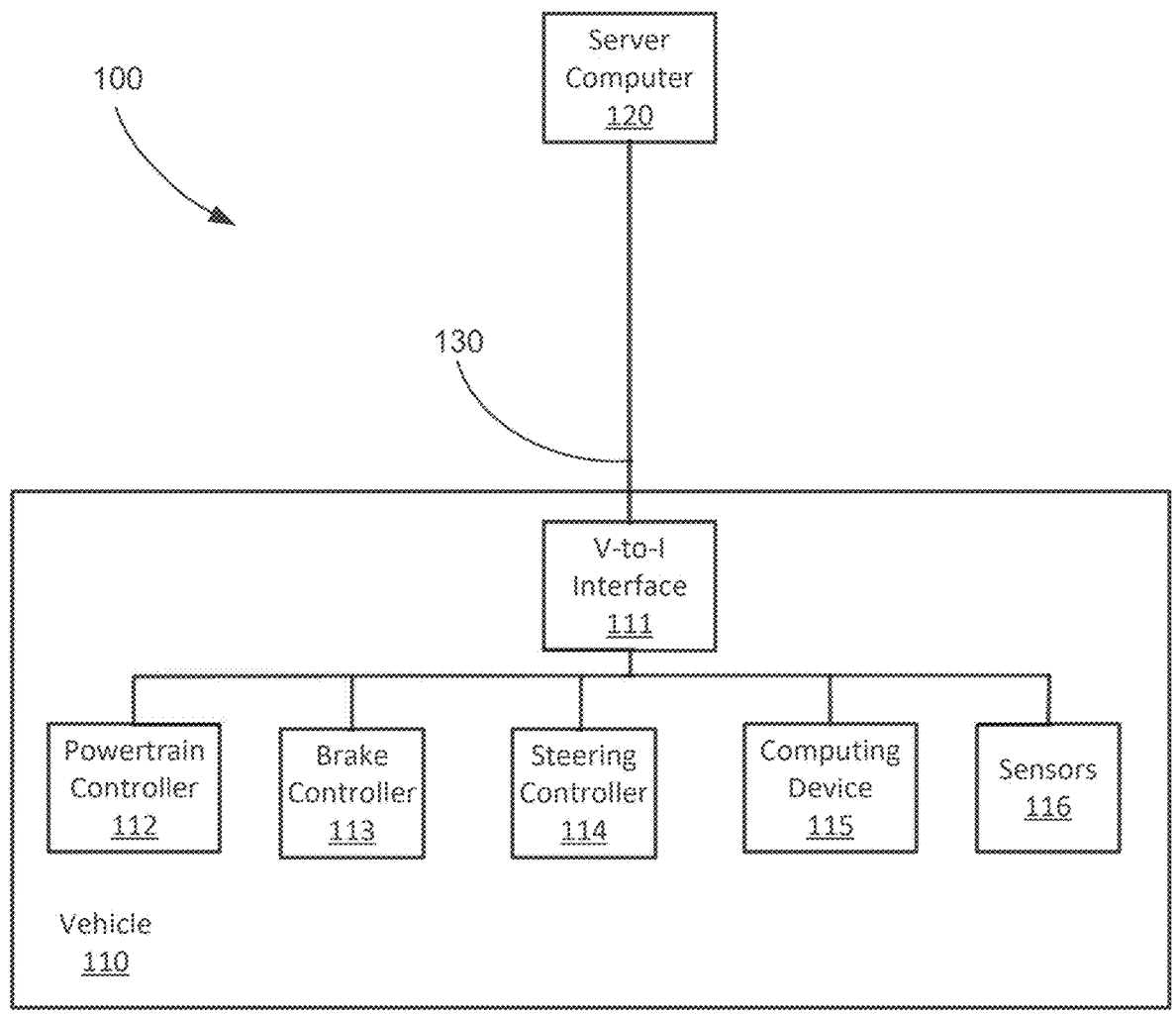
FIG. 1 is a block diagram of an example vehicle system.

Systems including vehicles, robots, drones, etc., can be operated by acquiring sensor data, including data regarding an environment around the system, and processing the sensor data to determine locations of objects in the environment around the system. The determined location data could be processed to determine operation of the system or portions of the system. For example, a robot could determine the location of another nearby robot's arm. The determined robot arm location could be used by the robot to determine a path upon which to move a gripper to grasp a workpiece without encountering the other robot's arm. In another example, a vehicle could determine a location of another vehicle traveling on a roadway. The vehicle could use the determined location of the other vehicle to determine a path upon which to operate while maintaining a predetermined distance from the other vehicle. Vehicle operation will be used as a non-limiting example of system location determination in description below.

In examples herein, a vehicle can use a machine learning system, for example a convolutional neural network, to determine identities and locations of one or more objects included in the environment, for example other vehicles, pedestrians, and obstacles including traffic barriers, signage, etc. Training a machine learning system such as a convolutional neural network to identify and locate objects can require a training dataset that can include thousands of video sequences that can include millions of images. In addition, training a machine learning system such as a convolutional neural network can require ground truth data for the images in the training dataset. Ground truth includes annotation data regarding the identities and locations of objects included in the training dataset acquired from a source other than the machine learning system.

A training dataset can be generated by acquiring video sequences from real world vehicles traveling on real world roadways. The acquired video sequences can be annotated by having humans view the video sequences and entering identities and locations of objects occurring in the video sequences manually. Training a machine learning system can benefit from training datasets that include video sequences that include impacts and near-impacts between the vehicle acquiring the video sequence and objects in the environment. A near-impact is when the vehicle acquiring the video sequence comes within a user-determined distance of an object while operating, for example one meter. Training a machine learning system with video sequences that include impacts and near-impacts can teach the machine learning system to predict impacts and near-impacts based on acquired sensor data and alert the vehicle computer to take appropriate action.

Acquiring video sequences from real world vehicles that include impacts and near-impacts can be difficult and rare. Techniques for simulating traffic scenarios as described herein can enhance training machine learning systems by generating simulated traffic scenarios based on computer simulations of traffic scenes and objects. A traffic scenario is a video sequence that simulates the view from a vehicle's sensor's point of view rendered in a photorealistic fashion. Photorealistic fashion means that a simulated image can appear to a machine learning system as if it were acquired by a real world sensor, e.g., a machine learning system would achieve the same result upon inputting both a real world image of a scene and a photorealistically simulated version of the same scene.

Techniques for simulating traffic scenarios as described herein can enhance training of machine learning systems by photorealistically simulating a large number of traffic scenarios and evaluating the simulated traffic scenarios to determine which simulated traffic scenarios include impacts or near-impacts. Simulated traffic scenarios that include impacts and near-impacts can then be perturbed to generate additional impact or near-impact scenarios. Perturbing a traffic scenarios means slightly changing initial conditions that are used to generate the traffic scenarios to generate multiple variations of the traffic scenarios that include impacts and near-impacts. Generating multiple variations of traffic scenarios in this fashion enhances machine learning system training by providing multiple variations of impact and near-impact scenarios and increasing the probability that the machine learning system will correctly predict impact and near-impact scenarios.

Disclosed herein is a method including generating first traffic scenarios including one or more objects based on initialization and setup data for the one or more objects, wherein the first traffic scenarios are generated with a three-dimensional simulation engine and determining a probability of impact between the one or more objects included in the first traffic scenarios. A subset of the first traffic scenarios can be selected that include the probability of impact greater than a user-selected threshold. Second traffic scenarios can be generated based on perturbing the selected subset of the first traffic scenarios wherein the second traffic scenarios are generated with the three-dimensional simulation engine and a machine learning system can be trained based on the first and the second traffic scenarios. The selected subset of the first traffic scenarios can be determined by changing one or more parameters included in the initialization and setup data of the one or more objects. The three-dimensional simulation engine can receive the initialization and setup data and determine simulated video sequences including object trajectories for the one or more objects. The simulated video sequences can be based on photorealistic image rendering. The object trajectories for the one or more objects can be based on physics simulation.

The initialization and setup data can include initial locations and initial trajectories for the one or more objects. The probability of impact for the one or more objects can be based on four impact metrics and a random forest regressor. The four impact metrics can be based on longitudinal deceleration, a maximum allowable longitudinal deceleration, longitudinal acceleration, a maximum allowable longitudinal acceleration, lateral acceleration, and a maximum allowable lateral acceleration. The machine learning system can be a neural network that includes convolutional layers and fully connected layers. The trained machine learning system can be transmitted to a system included in a vehicle. The vehicle can be operated based on the trained machine learning system. The vehicle can be operated by controlling one or more of vehicle propulsion, vehicle steering, and vehicle brakes. The random forest regressor can include multiple decision trees. The multiple decision trees can randomly sample the four impact metrics over multiple traffic scenarios.

Further disclosed is a computer readable medium, storing program instructions for executing some or all of the above method steps. Further disclosed is a computer programmed for executing some or all of the above method steps, including a computer apparatus, programmed to generate first traffic scenarios including one or more objects based on initialization and setup data for the one or more objects, wherein the first traffic scenarios are generated with a three-dimensional simulation engine and determine a probability of impact between the one or more objects included in the first traffic scenarios. A subset of the first traffic scenarios can be selected that include the probability of impact greater than a user-selected threshold. Second traffic scenarios can be generated based on perturbing the selected subset of the first traffic scenarios wherein the second traffic scenarios are generated with the three-dimensional simulation engine and a machine learning system can be trained based on the first and the second traffic scenarios. The selected subset of the first traffic scenarios can be determined by changing one or more parameters included in the initialization and setup data of the one or more objects. The three-dimensional simulation engine can receive the initialization and setup data and determine simulated video sequences including object trajectories for the one or more objects. The simulated video sequences can be based on photorealistic image rendering. The object trajectories for the one or more objects can be based on physics simulation.

The instructions can include further instructions wherein the initialization and setup data can include initial locations and initial trajectories for the one or more objects. The probability of impact for the one or more objects can be based on four impact metrics and a random forest regressor. The four impact metrics can be based on longitudinal deceleration, a maximum allowable longitudinal deceleration, longitudinal acceleration, a maximum allowable longitudinal acceleration, lateral acceleration, and a maximum allowable lateral acceleration. The machine learning system can be a neural network that includes convolutional layers and fully connected layers. The trained machine learning system can be transmitted to a system included in a vehicle. The vehicle can be operated based on the trained machine learning system. The vehicle can be operated by controlling one or more of vehicle propulsion, vehicle steering, and vehicle brakes. The random forest regressor can include multiple decision trees. The multiple decision trees can randomly sample the four impact metrics over multiple traffic scenarios.

FIG. 1 is a diagram of a vehicle computing system 100. Vehicle computing system 100 includes a vehicle 110, a computing device 115 included in the vehicle 110, and a server computer 120 remote from the vehicle 110. One or more vehicle 110 computing devices 115 can receive data regarding the operation of the vehicle 110 from sensors 116. The computing device 115 may operate vehicle 110 based on data received from the sensors 116 and/or data received from the remote server computer 120. The server computer 120 can communicate with the vehicle 110 via a network 130.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (i.e., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, i.e., via a vehicle communications bus as described further below, more than one computing devices, i.e., controllers or the like included in the vehicle 110 for monitoring and/or controlling various vehicle components, i.e., a propulsion controller 112, a brake controller 113, a steering controller 114, etc. The computing device 115 is generally arranged for communications on a vehicle communication network, i.e., including a bus in the vehicle 110 such as a controller area network (CAN) or the like; the vehicle 110 network can additionally or alternatively include wired or wireless communication mechanisms such as are known, i.e., Ethernet or other communication protocols.

Via the vehicle network, the computing device 115 may transmit messages to various devices in vehicle 110 and/or receive messages from the various devices, i.e., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V2I) interface 111 with a remote server computer 120, i.e., a cloud server, via a network 130, which, as described below, includes hardware, firmware, and software that permits computing device 115 to communicate with a remote server computer 120 via a network 130 such as wireless Internet (WI-FI®) or cellular networks. V2X interface 111 may accordingly include processors, memory, transceivers, etc., configured to utilize various wired and/or wireless networking technologies, i.e., cellular, BLUETOOTH®, Bluetooth Low Energy (BLE), Ultra-Wideband (UWB), Peer-to-Peer communication, UWB based Radar, IEEE 802.11, and/or other wired and/or wireless packet networks or technologies. Computing device 115 may be configured for communicating with other vehicles 110 through V2X (vehicle-to-everything) interface 111 using vehicle-to-vehicle (V-to-V) networks, i.e., according to including cellular communications (C-V2X) wireless communications cellular, Dedicated Short Range Communications (DSRC) and/or the like, i.e., formed on an ad hoc basis among nearby vehicles 110 or formed through infrastructure-based networks. The computing device 115 also includes nonvolatile memory such as is known. Computing device 115 can log data by storing the data in nonvolatile memory for later retrieval and transmittal via the vehicle communication network and a vehicle to infrastructure (V2I) interface 111 to a server computer 120 or user mobile device 160.

As already mentioned, generally included in instructions stored in the memory and executable by the processor of the computing device 115 is programming for operating one or more vehicle 110 components, i.e., braking, steering, propulsion, etc., without intervention of a human operator. Using data received in the computing device 115, i.e., the sensor data from the sensors 116, the server computer 120, etc., the computing device 115 may make various determinations and/or control various vehicle 110 components and/or operations. For example, the computing device 115 may include programming to regulate vehicle 110 operational behaviors (i.e., physical manifestations of vehicle 110 operation) such as speed, acceleration, deceleration, steering, etc., as well as tactical behaviors (i.e., control of operational behaviors typically in a manner intended to achieve efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to monitor and/or control a specific vehicle subsystem. Examples include a propulsion controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more propulsion controllers 112, one or more brake controllers 113, and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computing device 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously, for example.

The vehicle 110 is generally a land-based vehicle 110 capable of autonomous and/or semi-autonomous operation and having three or more wheels, i.e., a passenger car, light truck, etc. Vehicle 110 includes one or more sensors 116, the V2I interface 111, the computing device 115 and one or more controllers 112, 113, 114. Sensors 116 may collect data related to the vehicle 110 and the environment in which the vehicle 110 is operating. By way of example, and not limitation, sensors 116 may include, i.e., altimeters, cameras, LIDAR, radar, ultrasonic sensors, infrared sensors, pressure sensors, accelerometers, gyroscopes, temperature sensors, hall sensors, optical sensors, voltage sensors, current sensors, mechanical sensors such as switches, etc. The sensors 116 may be used to sense the environment in which the vehicle 110 is operating, i.e., sensors 116 can detect phenomena such as weather conditions (precipitation, external ambient temperature, etc.), the grade of a road, the location of a road (i.e., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components, and accurate and timely performance of components of the vehicle 110.

Server computer 120 typically has features in common, e.g., a computer processor and memory and configuration for communication via a network 130, with the vehicle 110 V2I interface 111 and computing device 115, and therefore these features will not be described further to reduce redundancy. A server computer 120 can be used to develop and train software that can be transmitted to a computing device 115 in a vehicle 110.

Figure 2:
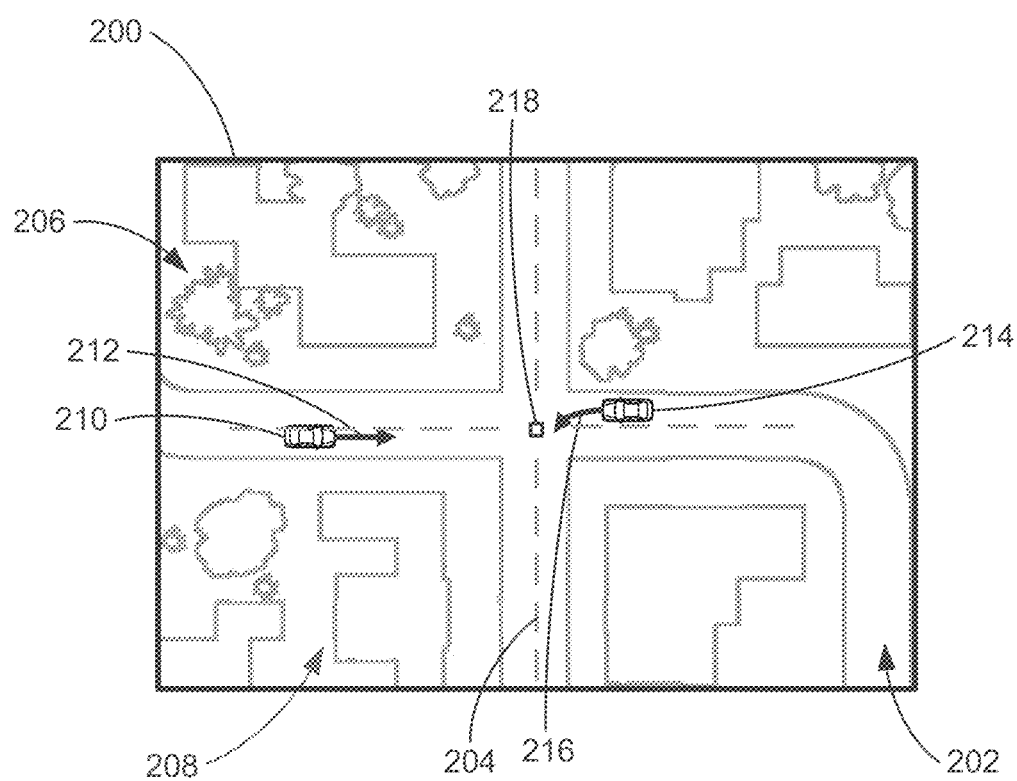
FIG. 2 is a diagram of example traffic scenario data.

FIG. 2 is a diagram of example initialization and setup data for traffic scenario generation. Initialization and setup data herein means data provided to generate a traffic scenario. Initialization and setup data includes parameters that describes the background and objects to be rendered by photorealistic rendering software, including initial locations and initial trajectories of the objects and data describing the environmental conditions to be rendered. Initialization and setup data is provided to photorealistic rendering software to permit the photorealistic rendering software to generate a video sequence that includes frames of video data, e.g., 2D images that appear as if they were acquired by sensors 116 included in a vehicle 110. Parameters included in initialization and setup data include a map 200. Map 200 is a set of digital data that includes data describing physical features at locations or coordinates, such as roadways 202, lane markers 204, traffic signals 218, foliage 206, including trees and bushes, and buildings 208. Map 200 data can be used by photorealistic rendering software to generate background portions of images in a video sequence. Background portions can be portions of an image that do not include moving objects such as vehicles and pedestrians, for example. Map 200 can include three-dimensional (3D) data regarding foliage 206 and buildings 208 to permit photorealistic rendering software to render a video sequence that includes two-dimensional (2D) views of map 200 rendered to appear at though it was acquired by a video camera located in ego vehicle 210 in map 200. Ego vehicle 210 is so-named because it is the point of view from which the photorealistic rendering software will generate images. Initialization and setup data can include makes, models, and colors of vehicles included in the simulation to permit photorealistic rendering of the vehicles. Initialization and setup data also include other objects, in this example a second vehicle 214.

Parameters included in initialization and setup data also can include initial locations and initial trajectories 212, 216 for ego vehicle 210 and one or more second vehicles 214, respectively. Trajectories 212, 216 include speed and direction data for ego vehicle 210 and second vehicle 214 at respective times. Initialization and setup data can also include driving styles for ego vehicle 210 and second vehicle 214, including lateral and longitudinal accelerations as a function of time. Initial locations and trajectories 212, 216 can be assigned randomly, for example. Other types of initialization and setup data include speed limits for roadways 202 and operational parameters of ego vehicle 210 and second vehicle 214 such as braking distances and follow distances. Initialization and setup data can also include environmental conditions such as lighting parameters such as time of day, cloud cover, sun position, precipitation, including rain, snow, sleet, etc., and other environmental conditions such as roadway friction values.

Initializalization and setup data also can include data used by the photorealistic rendering software. Initializalization and setup data can include the number of frames per second (FPS) included in the rendered video sequence and the total number of seconds to render. Initializalization and setup data can also include warm up time. Warm up time is the number of video frames required by the photorealistic rendering software to reach a steady state when rendering moving objects.

Figure 3:
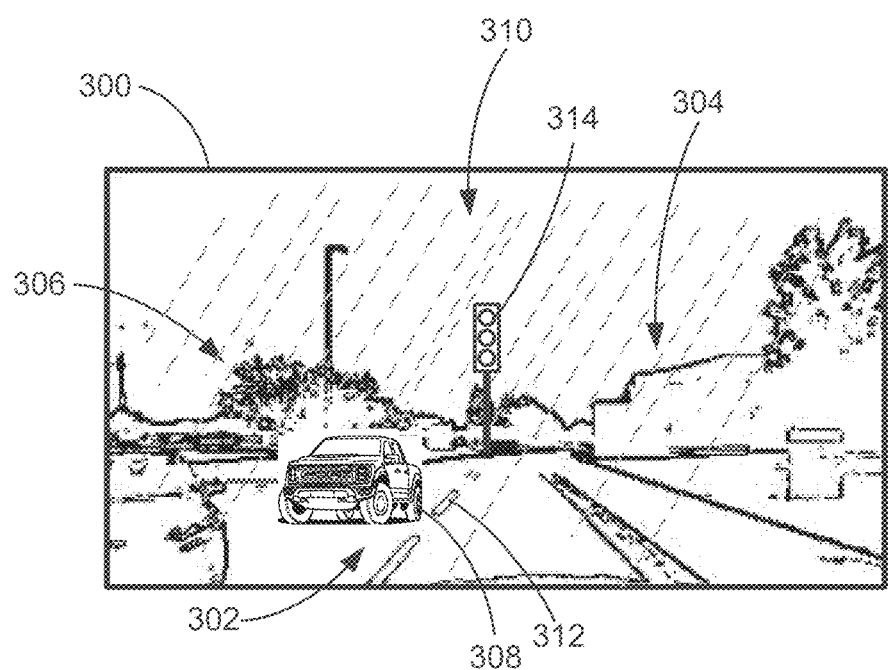
FIG. 3 is a diagram of an example traffic scenario image.

FIG. 3 is a diagram of a frame of video data 300 rendered by photorealistic rendering software as part of a sequence of video frames. The frame of video data 300 can be rendered in response to initialization and setup data received by photorealistic rendering software. An example of photorealistic rendering software is Unreal Engine, provided by Epic Games, Inc., Cary, NC 27518. Frame of video data 300 includes renderings of a roadway 302, lane markers 312, a traffic signal 314, buildings 304, foliage 306 and a rendered vehicle 308, all rendered from the point of view of a video camera included in ego vehicle 210. The frame of video data 300 also includes an environmental condition, in this example light rain 310 (dashed lines).

Photorealistic rendering software can include a physics engine that simulates the motion of moving objects. A physics engine can include a mathematical model for objects such as vehicles that includes their mass and rates of lateral and longitudinal acceleration to permit the photorealistic rendering software to realistically simulate the motion of the objects. Photorealistic rendering software can simulate the motion of objects such as vehicles, rendering each frame of video data in the video sequence on a frame-by-frame basis. Each frame can be rendered to include changes in locations of the objects while rendering the scene using ray tracing to accurately simulate the effects of light rays as they are reflected from the objects to a simulated camera lens. In this fashion, a video sequence that simulates image data that would be acquired by a video camera included in an ego vehicle 210 as the ego vehicle 210 travels on a map 200.

A video sequence generated by photorealistic rendering software can be realistic enough that it can be used to train a machine learning system. For example, a simulated video sequence can be generated by photorealistic rendering software that simulates a real world video sequence acquired by sensors 116 included in a vehicle 110 traveling in the real world. Receiving the simulated video sequence by a trained machine learning system to determine locations of objects in the simulated video sequence can obtain the same results as receiving the real world video sequence by the machine learning system.

Techniques described herein for generating simulated video sequences have several advantages over acquiring real world video sequences. Simulated video sequences can be generated far more quickly with fewer resources than real world video sequences. Various weather conditions can be simulated without travel or waiting for seasonal changes. Simulated video sequences include ground truth data regarding locations of objects in the scene and do not require further processing to be included in a training dataset. Because the physics engine included in the photorealistic rendering software determines the locations of each object in the scene prior to rendering, data regarding the locations of objects in the scene are available for each frame of rendered data. The generated video sequence is also repeatable, meaning that simulating a second video sequence based on the same data will yield the same video sequence data as the first video sequence, unlike attempting to repeat real world video sequences.

Techniques described herein for generating simulated video sequences have the advantage of being able to simulate impact or near-impact traffic scenarios without requiring real world impact or near-impact traffic scenarios to occur or be carried out. Simulated traffic scenarios can be processed by software as described herein to determine probabilities of impact or near-impact between objects included in the traffic scenarios. Techniques described herein can generate multiple variations of traffic scenarios and evaluate the probability of impacts or near-impacts automatically to provide the training dataset with multiple variations of multiple impact and near-impact traffic scenarios to enhance the ability of the machine learning system to correctly predict impact and near-impact traffic scenarios as they develop in real world situations.

Figure 4:
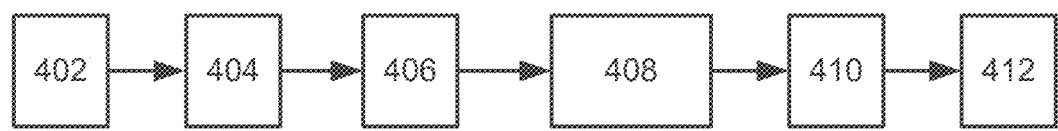
FIG. 4 is a diagram of an example system to generate traffic scenarios.

FIG. 4 is a diagram of a simulated traffic scenario exploration system 400. Simulated traffic scenario exploration system 400 explores the space of all traffic scenarios by generating simulated traffic scenarios based on randomized initialization and setup data 402. Initialization and setup data includes data as described above. The installation and setup data can be generated by analyzing a previously acquired real world video sequence. Installations and setup data can also be created from user input, where a background portion of an image can be supplied from map data, the objects, such as vehicles, can be specified from computer-aided design drawings and users can input the initial locations and trajectories for the objects. Environmental conditions can be specified from a library of images that include a variety of lighting and atmospheric effects. Prior to generating the traffic scenario, the vehicle location and trajectory data are randomly modified, typically with a specified range such as according to user-defined values, to provide variations in the generated traffic scenarios by randomizer 404. By randomizing initialization and setup data in this fashion, a single set of initialization and setup data can be used to generate multiple traffic scenarios that have variations in the paths traveled by vehicles in the traffic scenarios.

The randomizer 404 passes randomized initialization and setup data to data store 406, which stores the randomized initialization and setup data in memory included in the simulated traffic scenario exploration system 400. Data store 406 passes the randomized initialization and setup data to photorealistic rendering software 408 to generate a traffic scenario that includes a video sequence and ground truth data as described above in relation to FIG. 3. The rendered traffic scenario is passed to impact metrics 410 to determine whether the rendered traffic scenario includes an impact or near-impact between objects, in this example, vehicles.

Impact metrics 410 determines a probability of impact based on data determined by analyzing traffic scenario data regarding motion of the ego vehicle 210 in the video sequence. The motion of the ego vehicle 210 can be determined based on data regarding locations of the ego vehicle 210 in successive frames of the video sequence. Location data can be taken from the ground truth data output by the photorealistic rendering software and included in the traffic scenario along. In other examples, the video sequence can be processed by a machine learning system such as a convolutional neural network to determine locations of the ego vehicle 210 in successive frames using visual odometry. The location data from successive frames of video data can be used to determine latitudinal and longitudinal accelerations for the ego vehicle 210.

Latitudinal and longitudinal accelerations can be used to determine impact metrics that can be combined to determine probabilities of impact or near-impact for an ego vehicle 210 based on a rendered traffic scenario. An "impact metric" herein means a numeric value that specifies a probability of impact or near impact based on measurements of object motion from a traffic scenario. Object motion can be determined by locating objects in successive frames of video data, for example.

The first impact metric, $R_t^1$, is determined at frame t by the equation:

$$R_t^1 = \max \begin{cases} \frac{a_{decel,t}}{a_{md}} \\ \frac{a_{accel,t}}{a_{ma}} \end{cases} \quad (1)$$

Where $a_{decel,t}$ is the observed longitudinal deceleration at frame t and $a_{md}$ is the maximum allowable longitudinal deceleration. $a_{md}$ is user determined to be the maximum allowable longitudinal deceleration above which the frame is tagged as near-impact by setting $R_t^1=100$. $a_{accel,t}$ is the observed longitudinal acceleration at frame t and $a_{ma}$ is the maximum allowable longitudinal acceleration. $a_{ma}$ is user determined to be the maximum allowable longitudinal acceleration above which the frame is tagged as near-impact by setting $R_t^1=100$. The value of $R_t^1$ is determined by taking the maximum of $$\frac{a_{decel,t}}{a_{md}} \text{ and } \frac{a_{accel,t}}{a_{ma}}$$

in any frame t.

The second impact metric, $R_t^2$ is determined at frame t by the equation:

$$R_t^2 = \left( \frac{|a_{lat,x}|}{a_{ml}} \right) \quad (2)$$

Where $|a_{lat,x}|$ is the observed lateral acceleration measured in the x direction perpendicular to the direction of travel and $a_{ml}$ is the maximum allowable lateral acceleration. $a_{ml}$ is user determined to be the maximum allowable lateral acceleration above which the frame is tagged as near-impact by setting $R_t^2=100$.

The third impact metric, $R_t^3$, is determined at frame t by the equation:

$$R_t^3 = \frac{0.8 * R_t^1 + 0.2 * R_t^2}{2} \quad (3)$$

The third impact metric, $R_t^3$ is the weighted mean of $R_t^1$ and $R_t^2$.

The fourth impact metric, $R_t^4$, is determined at frame t by the equation:

$$R_t^4 = \frac{\Sigma_t 1(a_{decel,t} > 0.3 \text{ g})}{\Sigma_t 1(a_{decel,t} > 0.1 \text{ g})} * 0.5 + \frac{\Sigma_t 1(a_{lat,x} > 0.4 \text{ g})}{\Sigma_t 1(a_{lat,x} > 0.2 \text{ g})} * 0.5 \quad (4)$$

$R_t^4$ calculates how long the ego vehicle 210 is operated with longitudinal deceleration above 0.3 g relative to longitudinal deceleration above 0.1 g, where g is acceleration or deceleration equal to one gravity, or 9.81 meters/second². $R_t^4$ simultaneously calculates how long the ego vehicle 210 is operated with lateral acceleration above 0.4 g relative to 0.2 g lateral acceleration. The mean of these two lateral acceleration ratios is a measure of probability of impact based on the ego vehicle's 210 operating behavior at frame t of the traffic scenario.

The fifth impact metric, $R_t^5$, is determined at frame t using a random forest regressor. A random forest regressor is an estimator that fits multiple decision trees on sub-samples of a dataset and uses averaging to enhance the accuracy of the estimate. In this example the decision trees are based on the measures of lateral and longitudinal accelerations. The equations (1)-(4), above, can be expressed as a tree, with decision nodes based on user-determined ranges of values for the input acceleration values. The end leaves of the trees are the impact metrics output by equations (1)-(4). The random forest regressor can average the impact metrics to determine a probability of impact $R_t^5$ for a traffic scenario. The values of metrics $R_t^1$, $R_t^2$, $R_t^4$, and $R_t^4$ over multiple traffic scenarios are randomly sampled to form multiple decision trees that predict a final probability of impact $R_t^5$. The random forest regressor is trained using baseline probability $R_t^s$, where baseline probability in this example is the probability of impact of a traffic scenario, e.g., "impact", "near-impact" or "no impact" from traffic scenarios in the training dataset. Baseline probabilities can be determined by measuring distance between objects in traffic scenarios in the training dataset. For example, the baseline probability $R_t^s$ can be encoded as $R_t^s=100$ percent when an impact is observed, $R_t^s=50$ percent when a near-impact is observed, and $R_t^s=0$ percent when no impact or near-impact is observed. The random forest regressor is trained to output an impact metric $R_t^5$ equal to the observed outcome $R_t^s$, with the exception that impact metric $R_t^5$ is continuously distributed between 0 and 100, rather than a discrete distribution such as $R_t^s$. At impact metrics 410, traffic scenarios having impact metrics Re greater than a user-determined threshold, which can be 80, for example, are recorded and stored in memory and labeled as high probability impact or near-impact traffic scenarios 412 by the simulated traffic scenario exploration system 400.

Figure 5:
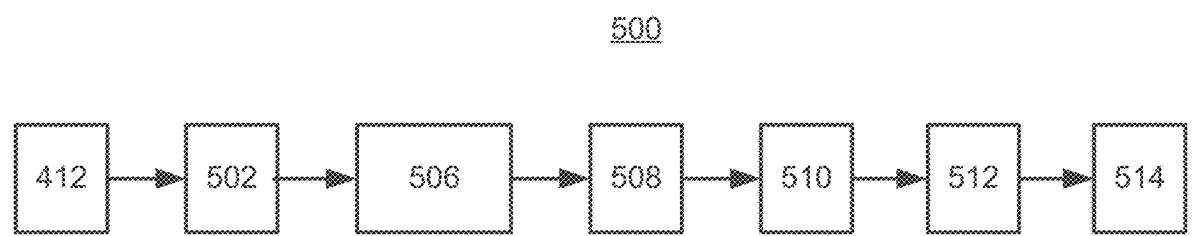
FIG. 5 is a diagram of an example system to generate additional traffic scenarios.

FIG. 5 is a diagram of a simulated traffic scenario exploitation system 500. Simulated traffic exploitation system 500 exploits the high probability impact or near-impact traffic scenarios generated by the simulated traffic scenario exploration system 400 by randomly perturbing (i.e., changing)

the initialization and setup data for the traffic scenarios that have been determined to be high probability near-impact or impact traffic scenarios 412. For example, a random number generator can generate random numbers to be applied to parameters included in the initialization and setup data. The random numbers are conditioned to generate perturbations in the parameters included in the initialization and setup data, meaning that the changes in the parameters are small with respect to the size of the parameters. Small changes, for example on the order of one or two percent in a parameter will generate a traffics scenario that is different but similar to the traffic scenario generated by unperturbed initialization and setup data. In this fashion, if a traffic scenario has a high probability of including an impact or near-impact, a the traffic scenarios generated based on perturbed data can be examined to determine whether or not the perturbed data will also result in an impact or near-impact. Simulated traffic scenario exploitation system 500 generates multiple traffic scenarios for each high probability near-impact or impact traffic scenario 412 to provide multiple versions of the high probability near-impact or impact traffic scenarios 412 that include multiple variations of the high probability near-impact or impact traffic scenarios 412 for training a machine learning system.

Perturber 502 receives as input the high probability near-impact or impact traffic scenarios 412 from FIG. 4 along with the stored initialization and setup data for the high probability near-impact or impact traffic scenarios 412 saved at record and store 406. Perturber 502 "rewinds" the traffic scenarios 412 by restarting the traffic scenario a user-defined number of seconds before an impact or near-impact evert, for example five seconds. Perturber 502 then perturbs or modifies by a small amount the parameters included in the initialization and setup data starting at the user-defined point before the impact or near-impact event. For example, the starting locations and trajectories of ego vehicle 210 and second vehicle 214 can be changed. The environmental conditions can also be changed. The amount of change can be randomly selected and conditioned to yield resulting traffic scenarios that have similar probabilities of impact or near-impact but provide differently appearing video sequences and different ground truth data to provide variations in a training dataset. Providing variations of video sequences and ground truth data while maintaining high probabilities of impact or near-impact in the traffic scenarios can enhance the ability a machine learning system to recognize impact or near-impact traffic scenarios in real world traffic situations.

Renderer 506 generates a traffic scenario based on perturbed initialization and setup data using photorealistic rendering software as discussed above in relation to FIG. 3. Following rendering the traffic scenario, record and store 508 stores the perturbed initialization and setup data along with the video sequence and ground truth data included in the traffic scenario generated by Renderer 506 in memory included in simulated traffic scenario exploitation system 500 in server computer 120. Following record and store 508, impact assessment 510 determines probabilities of impact or near-impact using a random forest regressor as described above in relation to FIG. 4.

Following determination of probability of impact or near-impact at impact assessment 510, the probability of impact or near-impact is compared to a user-determined minimum at probability comparison 512. Probability comparison 512 compares the probability of impact or near-impact to a user-determined minimum, for example 80 percent, to ensure that the determined traffic scenario includes a high probability of near-impact or impact before including the traffic scenario in a training dataset for training a machine learning system. The simulated traffic scenario exploitation system 500 will continue to generate perturbed traffic scenarios until the user-defined minimum is reached.

Following determination of probability of impact or near-impact, the traffic scenario is added to the current set of perturbed traffic scenarios and passed to convergence test 514. The convergence test compares the distributions of probabilities included in the current set of traffic scenarios with distributions of probabilities included in previous sets of traffic scenarios using Kullback-Liebler (KL) divergence. KL divergence measures distance between probability distributions. KL divergence measured between probability distributions from the current set of perturbed traffic scenarios and probability distributions from previous sets of perturbed traffic scenarios can be compared to a user-defined minimum distance a. The user-defined minimum distance a can be determined empirically by examining sets of perturbed traffic scenarios and determining when additional perturbed traffic scenarios would not change the measured KL divergence appreciably. Measured KL divergence being less than a user-defined minimum distance a indicates that the current set of perturbed traffic scenarios generated by simulated traffic scenario exploitation system 500 have converged to a stable solution and the process of generating perturbed traffic scenarios can end. When the process of generating perturbed traffic scenarios converges, the generated perturbed traffic scenarios can be saved in memory and the simulated traffic scenario exploitation system 500 returns to exploit the next traffic scenario 412 in the queue. Following convergence test 514, traffic scenarios with high probability of impact or near-impact are transferred to a training dataset which can be included in memory included in server computer 120.

Following generation of traffic scenarios with high probability of impact or near-impact by simulated traffic scenario exploitation system 500 and transfer to a training dataset, the training dataset can be used to train a machine learning system, for example a convolutional neural network to predict impact and near-impact traffic situations based on sensor 116 input from a vehicle 110. For example, a machine learning system can be trained on server computer 120 based on the training dataset and communicated to a computing device 115 in a vehicle 110. The trained machine learning system executing on computing device 115 can receive sensor data from a sensor 116, for example a video camera, included in a vehicle 110. In response to the sensor 116 input, machine learning system can output a prediction for vehicle 110 that includes a probability of impact or near-impact with an object in the environment around vehicle 110. In response to a prediction that includes a high probability of impact or near impact with an object, computing device 115 can determine a vehicle path that reduces the probability of impact or near-impact with the object. A vehicle path is a predicted trajectory for vehicle travel that includes lateral and longitudinal accelerations. Computing device 115 can then control one or more of vehicle propulsion, vehicle steering, or vehicle brakes via controllers 112, 113, 114 to cause vehicle 110 to travel on the vehicle path and reduce the probability of impact or near-impact.

Figure 6:
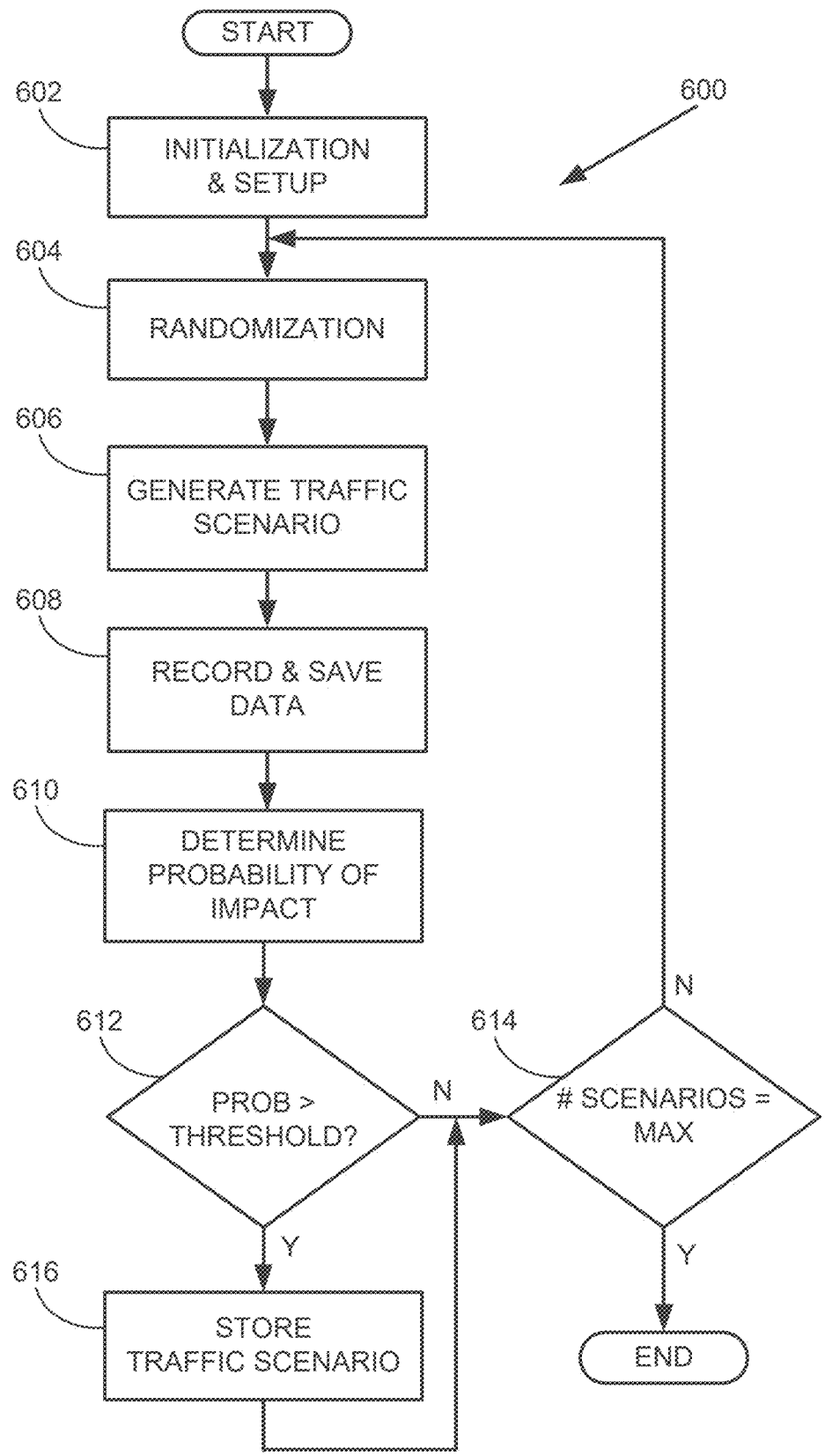
FIG. 6 is a flowchart diagram of an example process to generate traffic scenarios.

FIG. 6 is a flowchart of a process 600 for generating traffic scenarios with a simulated traffic scenario exploration system 400. Process 600 can be implemented in a server computer 120, for example. Process 600 includes multiple blocks that can be executed in the illustrated order. Process 600 could alternatively or additionally include fewer blocks, and/or can include the blocks executed in different orders.

Process 600 begins at block 602, where initialization and setup data for generating traffic scenarios is determined. As described above in relation to FIGS. 3-5, the initialization and setup data can be determined based on user input or determined by processing, with a machine learning system such as a convolutional neural network, real world video sequences acquired by sensors 116 included in a vehicle 110. Initialization and setup data includes initial locations, trajectories, including lateral and longitudinal accelerations for one or more objects, which can include vehicles, pedestrians, etc., map data, and environmental conditions.

At block 604 the initialization and setup data are randomized to alter the initial conditions to permit the process 600 to generate multiple traffic scenarios with different outcomes including different probabilities of impact or near-impact between objects included in the traffic scenarios.

At block 606 the randomized initialization and setup data in received by photorealistic rendering software to generate a traffic scenario including a video sequence and ground truth data as described above in relation to FIGS. 3-5, above.

At block 608 the generated traffic scenario and randomized initialization and setup data is recorded and stored in memory included in simulated traffic scenario exploration system 400 in a server computer 120.

At block 610 a probability of impact or near-impact for the generated traffic scenario is determined using a random forest regressor as described in relation to FIG. 4, above.

At block 612 the probability of impact or near-impact for the generated traffic scenario is compared to a user-defined threshold as described above in relation to FIG. 4, above. When the probability of impact or near-impact is less than the user-defined threshold, process 600 passes to block 614. When the probability of impact or near-impact is greater than or equal to the user-defined threshold, process 600 passes to block 616.

At block 614, the number of completed traffic scenarios for process 600 is compared to a user-defined maximum number of traffic scenarios. When the number of completed traffic scenarios is less than the maximum number of traffic scenarios, process 600 increments the completed number of traffic scenarios and passes to block 604, where new randomization is applied to initialization and set up data and a new traffic scenario is generated. When the number of completed traffic scenarios is equal to the user-determined maximum, process 600 ends.

At block 616 the probability of impact or near-impact for the current traffic scenario has been determined to be high probability. The traffic scenario is recorded and stored in memory included in simulated traffic scenario exploration system 400 in server computer 120 as high probability impact or near-impact traffic scenarios 412. Following block 616 process 600 passes to block 614 to check to see if the maximum number of scenarios has been reached.

Figure 7:
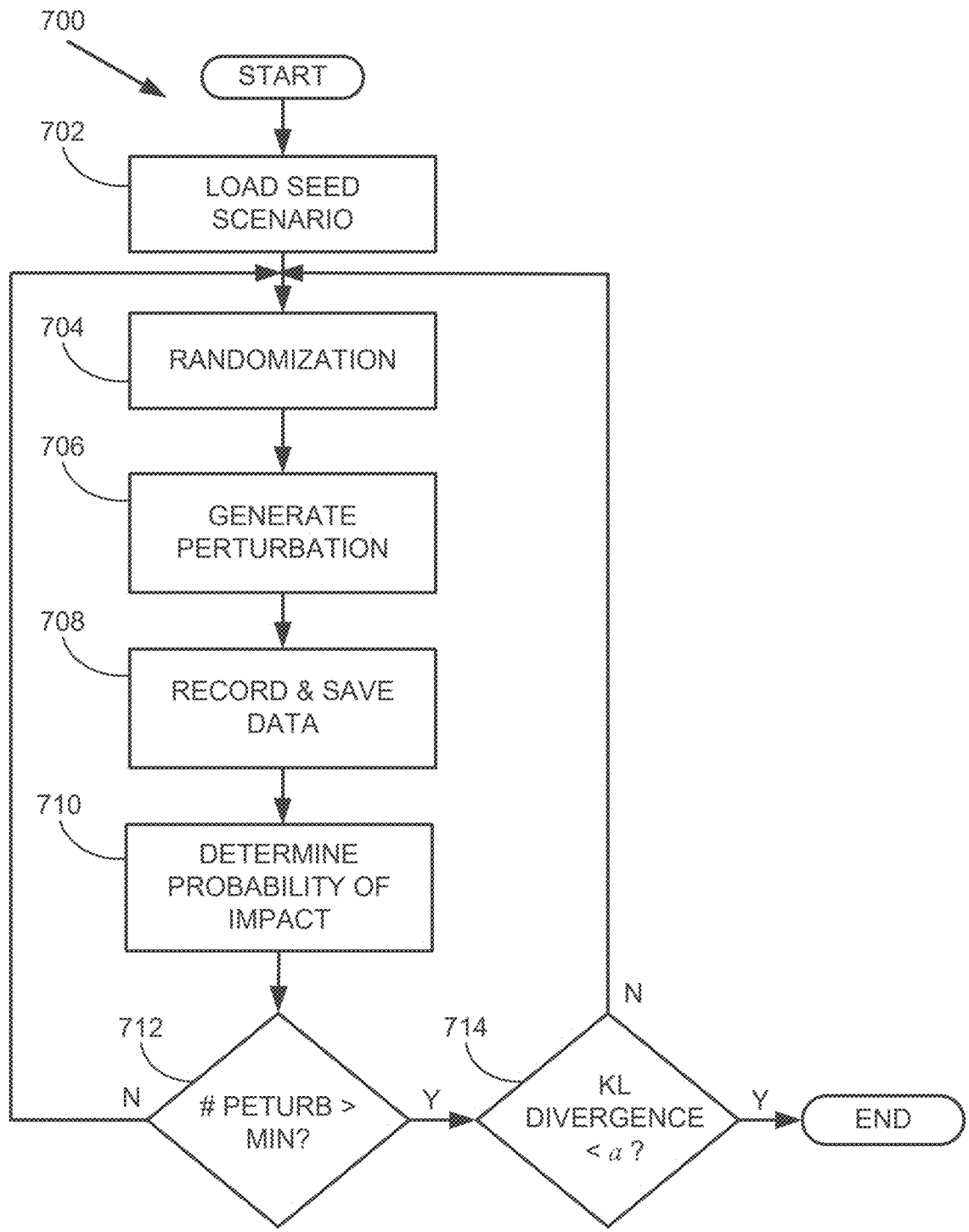
FIG. 7 is a flowchart diagram of an example process to generate additional traffic scenarios.

FIG. 7 is a flowchart of a process 700 for generating perturbed traffic scenarios with a simulated traffic scenario exploitation system 500. Process 700 can be implemented in a server computer 120, for example. Process 700 includes multiple blocks that can be executed in the illustrated order. Process 700 could alternatively or additionally include fewer blocks, and/or can include the blocks executed in different orders.

Process 700 begins at block 702, where a seed traffic scenario is loaded from high probability impact or near-impact traffic scenarios 412 generated by simulated traffic scenario exploration system 400 as described in relation to process 600 in FIG. 6, above. The traffic scenario includes a video sequence, ground truth data, and initialization and setup data used to generate the traffic scenario.

At block 704 a random number generates random numbers to be applied to perturb parameters included in the initialization and setup data. The random numbers are conditioned to generate perturbations in the parameters included in the initialization and setup data as described above in relation to FIG. 5.

At block 706 the perturbed initialization and setup data in received by photorealistic rendering software to generate a traffic scenario including a video sequence and ground truth data as described above in relation to FIG. 5, above.

At block 708 the generated traffic scenario and randomized initialization and setup data is recorded and stored in memory included in memory included in simulated traffic scenario exploitation system 400 in server computer 120.

At block 710 a probability of impact or near-impact for the generated traffic scenario is determined using a random forest regressor as described in relation to FIG. 4, above.

At block 712, the number of completed traffic scenarios for process 700 is compared to a user-defined minimum number of traffic scenarios. When the number of completed traffic scenarios is less than the minimum number of traffic scenarios, process 700 increments the completed number of traffic scenarios and passes to block 704, where new randomization is applied to initialization and set up data and a new traffic scenario is generated. When the number of completed traffic scenarios is equal to the user-determined minimum, process 700 passes to block 714.

At block 714 the distribution of probabilities included in the current perturbed traffic scenario is compared to distributions of probabilities included in previously generated traffic scenarios by determining the KL divergence between the distributions of probabilities for the current set of perturbed traffic scenarios and a previously determined set of perturbed traffic scenarios comparing it to a user-defined minimum distance a as described above in relation to FIG. 5. If the KL divergence is greater than the user-defined minimum distance a, the process 700 has not converged and process 700 passes to block 704 to generate additional perturbed traffic scenarios based on the current initialization and setup data. If the KL divergence less than the user-defined minimum distance a, process 700 ends.

Figure 8:
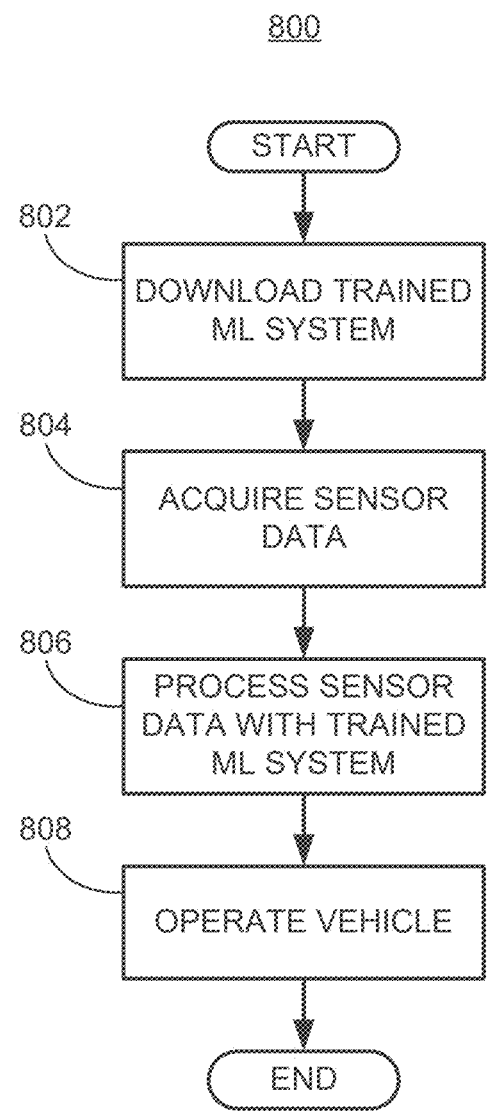
FIG. 8 is a flowchart diagram of an example process to operate a vehicle.

FIG. 8 is a flowchart of a process 800 for operating a vehicle 110 with a machine learning system trained using a training dataset generated by a simulated traffic scenario exploration system 400 and a simulated traffic scenario exploitation system 500. Process 800 can be implemented in a computing device 115 in a vehicle 110, for example. Process 800 includes multiple blocks that can be executed in the illustrated order. Process 800 could alternatively or additionally include fewer blocks, and/or can include the blocks executed in different orders.

Process 800 begins at block 802, where a computing device 115 in a vehicle 110 downloads a machine learning system trained with a training database generated by a simulated traffic scenario exploration system 400 and a simulated traffic scenario exploitation system 500 as described in relation to FIGS. 4 and 5, above. For example, the machine learning system can be a convolutional neural network which includes convolutional layers and fully connected layers.

At block 804 computing device 115 acquires sensor data from one or more sensors 116. For example, computing device 115 can input an image from a video sensor that includes image data regarding an environment around the vehicle 110.

At block 806 the machine learning system can receive the acquired image and process it to determine a probability of impact or near-impact with an object in the environment around vehicle 110.

At block 808 computing device 115 can receive the probability of impact or near-impact and determine a vehicle path that reduces the probability of impact or near-impact. For example, computing device 115 can determine a vehicle path that applies vehicle steering to direct vehicle 110 away from the object or applies vehicle brakes to slow vehicle 110. Computing device 115 can transmit commands to vehicle controllers 112, 113, 114 to control one or more of vehicle propulsion, vehicle steering, and vehicle brakes to cause vehicle 110 to travel on the determined vehicle path. Following block 808 process 800 ends.

Any action taken by a vehicle or user of the vehicle in response to one or more navigation prompts disclosed herein should comply with all rules and regulations specific to the location and operation of the vehicle (e.g., Federal, state, country, city, etc.). More so, any navigation prompts disclosed herein are for illustrative purposes only. Certain navigation prompts may be modified and/or omitted depending on the context, situation, and applicable rules and regulations. Further, regardless of the navigation prompts, users should use good judgement and common sense when operating the vehicle. That is, all navigation prompts, whether standard or "enhanced," should be treated as suggestions and only followed when safe to do so and when in compliance with any rules and regulations specific to the location and operation of the vehicle.

Computing devices such as those described herein generally each includes commands executable by one or more computing devices such as those identified above, and for carrying out blocks or steps of processes described above. For example, process blocks described above may be embodied as computer-executable commands.

Computer-executable commands may be compiled or interpreted from computer programs created using a variety of programming languages and/or technologies, including, without limitation, and either alone or in combination, Java™, C, C++, Python, Julia, SCALA, Visual Basic, Java Script, Perl, HTML, etc. In general, a processor (i.e., a microprocessor) receives commands, i.e., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium (also referred to as a processor-readable medium) includes any non-transitory (i.e., tangible) medium that participates in providing data (i.e., instructions) that may be read by a computer (i.e., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, i.e., a candidate to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same reference numbers indicate the same elements. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The invention claimed is:

1. A method, comprising:
generating first traffic scenarios including one or more objects based on initialization and setup data for the one or more objects, wherein the first traffic scenarios are generated with a three-dimensional simulation engine;
determining a probability of impact based on randomly sampling multiple decision trees using a random forest regressor to predict the probability of impact between the one or more objects included in the first traffic scenarios and an ego vehicle;
selecting a subset of the first traffic scenarios that include the probability of impact greater than a user-selected threshold;
generating second traffic scenarios based on perturbing the selected subset of the first traffic scenarios wherein the second traffic scenarios are generated with the three-dimensional simulation engine; and
training a machine learning system based on the first and the second traffic scenarios.

2. The method of claim 1, further comprising perturbing the selected subset of the first traffic scenarios by changing one or more parameters included in the initialization and setup data of the one or more objects.

3. The method of claim 1, wherein the three-dimensional simulation engine receives the initialization and setup data and determines simulated video sequences including object trajectories for the one or more objects.

4. The method of claim 3, wherein the simulated video sequences are based on photorealistic image rendering.

5. The method of claim 4, wherein the object trajectories for the one or more objects are based on physics simulation.

6. The method of claim 1, wherein the initialization and setup data include initial locations and initial trajectories for the one or more objects.

7. The method of claim 1, wherein the random forest regressor is based on four impact metrics.

8. The method of claim 7, wherein the four impact metrics are based on longitudinal deceleration, a maximum allowable longitudinal deceleration, longitudinal acceleration, a maximum allowable longitudinal acceleration, lateral acceleration, and a maximum allowable lateral acceleration.

9. The method of claim 1, wherein the machine learning system is a neural network that includes convolutional layers and fully connected layers.

10. The method of claim 1, further comprising transmitting the trained machine learning system to a system included in a vehicle.

11. The method of claim 10, further comprising operating the vehicle based on the trained machine learning system.

12. The method of claim 11, further comprising operating the vehicle by controlling one or more of vehicle propulsion, vehicle steering, and vehicle brakes.

13. A system, comprising:
a computer that includes a processor and a memory, the memory including instructions executable by the processor to:
transmit a trained machine learning system, wherein the machine learning system is trained with a training dataset determined by:
generating first traffic scenarios including one or more objects based on initialization and setup data for the one or more objects, wherein the first traffic scenarios are generated with a three-dimensional simulation engine;
determining a probability of impact based on randomly sampling multiple decision trees using a random forest regressor to predict the probability of impact between the one or more objects included in the first traffic scenarios and an ego vehicle;
selecting a subset of the first traffic scenarios that include the probability of impact greater than a user-selected threshold;
generating second traffic scenarios based on perturbing the selected subset of the first traffic scenarios wherein the second traffic scenarios are generated with the three-dimensional simulation engine; and
training the machine learning system based on the first and the second traffic scenarios.

14. The system of claim 13, further comprising a second computer for a vehicle that includes a second processor and a second memory, the second memory including second instructions executable by the second processor to receive and obtain output from the trained machine learning system.

15. The second computer of claim 14, the second instructions including further instructions to determine a vehicle path based on the trained machine learning system.

16. The second computer of claim 15, the second instructions including further instructions to operate the vehicle based on the vehicle path.

17. The second computer of claim 16, the second instructions including further instructions to operate the vehicle by controlling one or more of vehicle propulsion, vehicle steering, and vehicle brakes.

18. The system of claim 13, including further instructions to perturb the selected subset of the first traffic scenarios by changing one or more parameters included in initialization and setup data of the one or more objects.

19. The system of claim 13, wherein the three-dimensional simulation engine receives the initialization and setup data and determines simulated video sequences including object trajectories for the one or more objects.

20. The system of claim 19, wherein the simulated video sequences are based on photorealistic image rendering.

* * * * *